US011243764B1

(12) United States Patent
Shao et al.

(10) Patent No.: US 11,243,764 B1
(45) Date of Patent: Feb. 8, 2022

(54) CODE DEPLOYMENT

(71) Applicant: INTERNATIONAL BUSINESS MACHINES CORPORATION, Armonk, NY (US)

(72) Inventors: Yi Shao, Xi'an (CN); Liang Wang, Xi'an (CN); Lei Tian, Xi'an (CN); Zhe ZL Liu, Xi'an (CN); Chun Lei Xu, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/948,259

(22) Filed: Sep. 10, 2020

(51) Int. Cl.
*G06F 9/44* (2018.01)
*G06F 8/77* (2018.01)
*G06F 9/50* (2006.01)
*G06F 8/60* (2018.01)

(52) U.S. Cl.
CPC ............... *G06F 8/77* (2013.01); *G06F 8/60* (2013.01); *G06F 9/5055* (2013.01)

(58) Field of Classification Search
CPC ............ G06F 8/60; G06F 8/77; G06F 9/5055
USPC .................................. 717/120–122, 168–173
See application file for complete search history.

(56) References Cited

U.S. PATENT DOCUMENTS

| | | | | |
|---|---|---|---|---|
| 8,667,139 B2* | 3/2014 | Labat | .................... | G06F 9/5011 709/226 |
| 9,063,746 B2 | 6/2015 | Yousouf | | |
| 9,658,833 B2* | 5/2017 | Heyhoe | ..................... | G06F 8/45 |
| 10,108,460 B2* | 10/2018 | Gopisetty | ................. | G06F 8/60 |
| 10,353,882 B2 | 7/2019 | Tompkins | | |
| 10,366,346 B2* | 7/2019 | Achin | ..................... | G06N 20/00 |
| 10,732,967 B1* | 8/2020 | Kolazhi | .................... | G06F 8/60 |
| 11,038,778 B2* | 6/2021 | Govindaraju | ....... | H04L 41/5058 |
| 2005/0096950 A1* | 5/2005 | Caplan | ............. | G06Q 10/06314 705/7.24 |
| 2015/0121155 A1 | 4/2015 | Boshev | | |
| 2018/0121176 A1 | 5/2018 | Cook | | |

FOREIGN PATENT DOCUMENTS

WO 2018236886 A1 12/2018

OTHER PUBLICATIONS

Sun Microsystems, "Sun Java Enterprise System Deployment Planning White Paper", 2004, Sun Microsystems, Inc., 76 pages. (Year: 2004).*

(Continued)

*Primary Examiner* — Ted T. Vo
(74) *Attorney, Agent, or Firm* — Samuel A. Waldbaum

(57) ABSTRACT

According to embodiments of the present disclosure, a method, a device and a computer program product for code deployment are proposed. In the method, a deployment strategy for deploying code into a plurality of computing environments and respective amounts of resources provided by the plurality of computing environments are obtained. At least one code segment of the code to be deployed in a corresponding computing environment comprised in the plurality of computing environments is determined based on the deployment strategy and the respective amounts of resources. An amount of resources provided by the corresponding computing environment is sufficient to run the at least one code segment. The at least one code segment is deployed into the corresponding computing environment.

17 Claims, 10 Drawing Sheets

(56) References Cited

OTHER PUBLICATIONS

Veen et al., "Deployment Strategies for Distributed Applications on Cloud Computing Infrastructures", 2013, IEEE, pp. 228-233. (Year: 2013).*

Disclosed Anonymously, "Setting of merge attributes at an element construct level," IP.com, Sep. 11, 2013, 7 pages, IP.com No. IPCOM000230774D, Retrieved from the Internet: <URL: https://priorart.ip.com/IPCOM/000230774>.

Meixner, "Data-Driven Automatic Deployment in Edge Computing," Faculty of Informatics, Retrieved from the Internet: <URL: https://www.infosys.tuwien.ac.at/team/sschulte/theses/Thesis_3288_Thesis-Full-PDF.pdf>, Apr. 2018, 108 pages.

Mell, et al., "The NIST Definition of Cloud Computing", National Institute of Standards and Technology, Special Publication 800-145, Sep. 2011, 7 pages.

\* cited by examiner

```
import numpy as np
import pandas as pd dataset = pd.read_csv('./datasets/wine.csv')
dataset = dataset.sample(frac=1)                                    ⟵ 610
X = dataset.iloc[:, 1:13].values   #Explanatory variables
y = dataset.iloc[:, 13].values     #Target variable from sklearn.preprocessing import StandardScaler
sc = StandardScaler()                                               ⟵ 620
X = sc.fit_transform(X)

from sklearn.decomposition import PCA
pca = PCA(n_components = 2)
X = pca.fit_transform(X)

features = pd.DataFrame(X)
features.to_csv(os.environ['./datasets/features.csv'])
target = pd.DataFrame(y)
target.to_csv(os.environ['./datasets/target.csv'])

X = features.iloc[:,:].values
y = target['0'].values from sklearn.model_selection import train_test_split
X_train, X_test, y_train, y_test = train_test_split(X, y, test_size = 0.2, random_state = 0)

from sklearn.linear_model import LogisticRegression
classifier = LogisticRegression(random_state = 0)                   ⟵ 630
classifier.fit(X_train, y_train)

y_pred = classifier.predict(X_test)

from sklearn.metrics import confusion_matrix
cm = confusion_matrix(y_test, y_pred)
cm from joblib import dump, load
dump(classifier, './models/wine_classifier.joblib')
```

FIG. 6

```
1000
    import numpy as np
    import pandas as pd dataset = pd.read_csv('./datasets/wine.csv')                    ── 1010
    dataset = dataset.sample(frac=1)
    X = dataset.iloc[:, 0:13].values   #Explanatory variables
    y = dataset.iloc[:, 13].values     #Target variable from sklearn.preprocessing import StandardScaler
    sc = StandardScaler()
    X = sc.fit_transform(X)

from sklearn.decomposition import PCA
    pca = PCA(n_components = 2)
    X = pca.fit_transform(X)

features = pd.DataFrame(X)                                      ── 1020
    features.to_csv(os.environ['./datasets/features.csv'])
    target = pd.DataFrame(y)
    target.to_csv(os.environ['./datasets/target.csv'])              ── 1030

X = features.iloc[:,1:].values
    y = target['0'].values from sklearn.model_selection import train_test_split
    X_train, X_test, y_train, y_test = train_test_split(X, y, test_size = 0.2, random_state = 0)

from sklearn.linear_model import LogisticRegression
    classifier = LogisticRegression(random_state = 0)
    classifier.fit(X_train, y_train)

y_pred = classifier.predict(X_test)

from sklearn.metrics import confusion_matrix
    cm = confusion_matrix(y_test, y_pred)
    cm from joblib import dump, load
    dump(classifier, './models/wine_classifier.joblib')
```

1040 — DATA PREPARATION AND TRANSFORMATION

1050 — MODEL TRAINING AND MAKING PREDICTION

FIG. 10

CODE DEPLOYMENT

BACKGROUND

The present disclosure relates to code deployment, and more specifically, to a method, system and computer program product for analyzing and dividing the code into code segments and deploying the code segments into a plurality of computing environments.

With the development of information technology, code such as code written in an object-oriented language, in a procedural language, or a script, may be executed in multiple computing environments, such as in an edge computing environment (such as edge servers and edge devices) and a multi-cloud computing environment (such as one or more private/public/hybrid clouds).

BRIEF SUMMARY

Additional aspects and/or advantages will be set forth in part in the description which follows and, in part, will be apparent from the description, or may be learned by practice of the invention.

According to a first aspect of the present disclosure, there is provided a computer-implemented method. According to the method, a deployment strategy for deploying code into a plurality of computing environments and respective amounts of resources provided by the plurality of computing environments are obtained. At least one code segment of the code to be deployed in a corresponding computing environment comprised in the plurality of computing environments is determined based on the deployment strategy and the respective amounts of resources. An amount of resources provided by the corresponding computing environment is sufficient to run the at least one code segment. The at least one code segment is deployed into the corresponding computing environment.

According to a second aspect of the present disclosure, there is provided a system. The system comprises a processing unit and a memory coupled to the processing unit and storing instructions thereon. The instructions, when executed by the processing unit, perform acts including: obtaining a deployment strategy for deploying code into a plurality of computing environments and respective amounts of resources provided by the plurality of computing environments; determining, based on the deployment strategy and the respective amounts of resources, at least one code segment of the code to be deployed in a corresponding computing environment comprised in the plurality of computing environments, an amount of resources provided by the corresponding computing environment being sufficient to run the at least one code segment; and deploying the at least one code segment into the corresponding computing environment.

According to a third aspect of the present disclosure, there is provided a computer program product comprising a computer-readable storage medium having program instructions embodied therewith. The program instructions are executable by a processor to cause the processor to perform acts of: obtaining a deployment strategy for deploying code into a plurality of computing environments and respective amounts of resources provided by the plurality of computing environments; determining, based on the deployment strategy and the respective amounts of resources, at least one code segment of the code to be deployed in a corresponding computing environment comprised in the plurality of computing environments, an amount of resources provided by the corresponding computing environment being sufficient to run the at least one code segment; and deploying the at least one code segment into the corresponding computing environment.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 6 depicts a schematic diagram of an example of candidate code segments according to an embodiment of the present disclosure.

FIG. 10 depicts a schematic diagram of an example of code segments according to an embodiment of the present disclosure.

DETAILED DESCRIPTION

Figure 1:
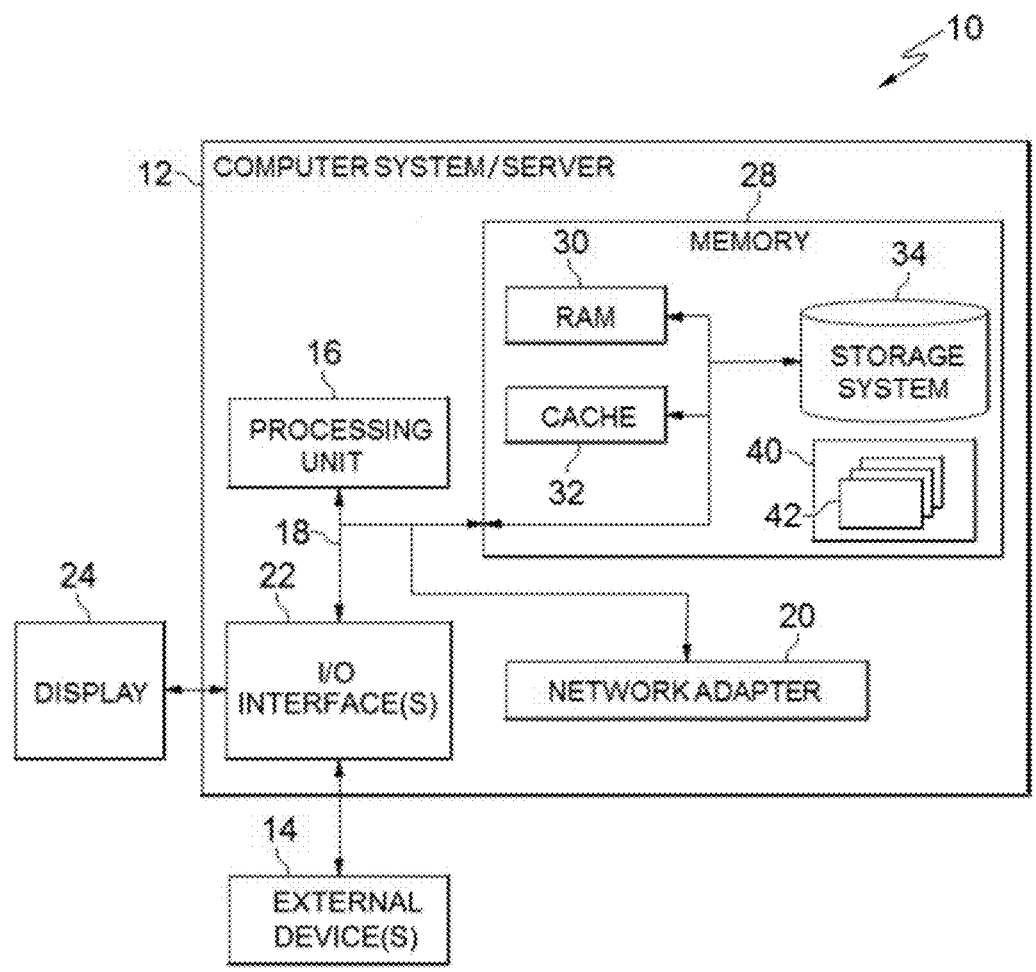
FIG. 1 depicts a cloud computing node according to an embodiment of the present disclosure.

The following description with reference to the accompanying drawings is provided to assist in a comprehensive understanding of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
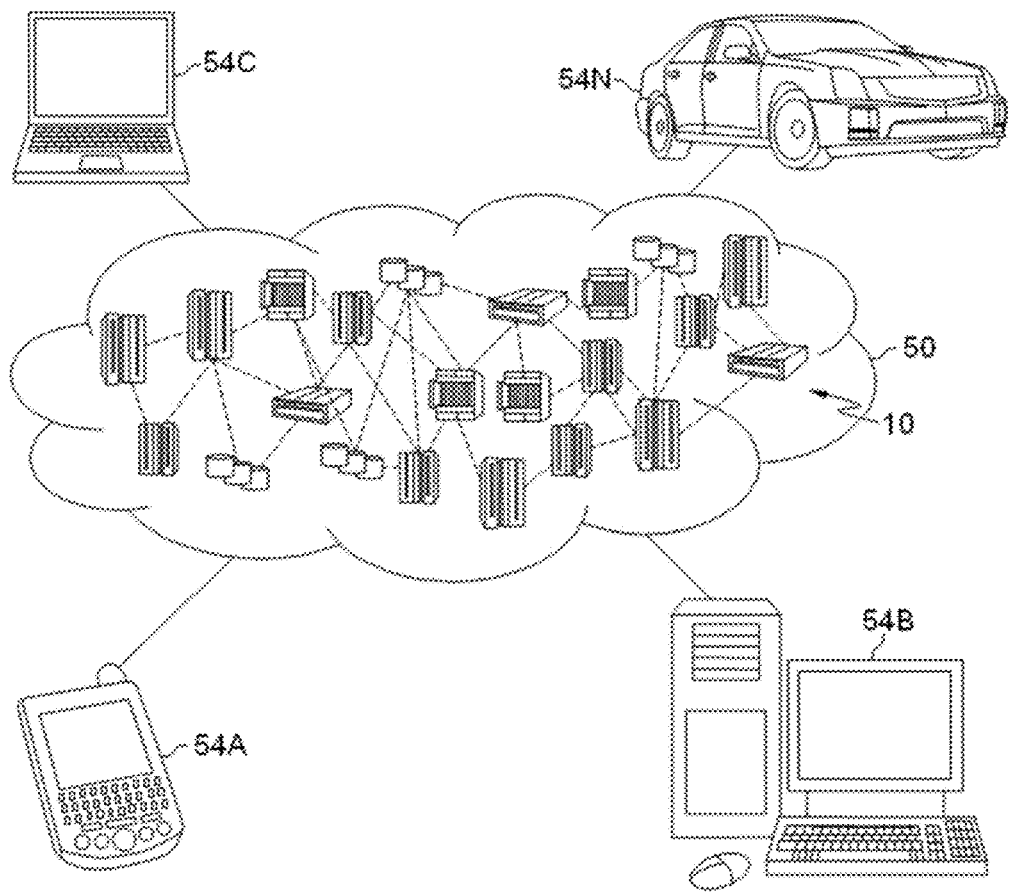
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
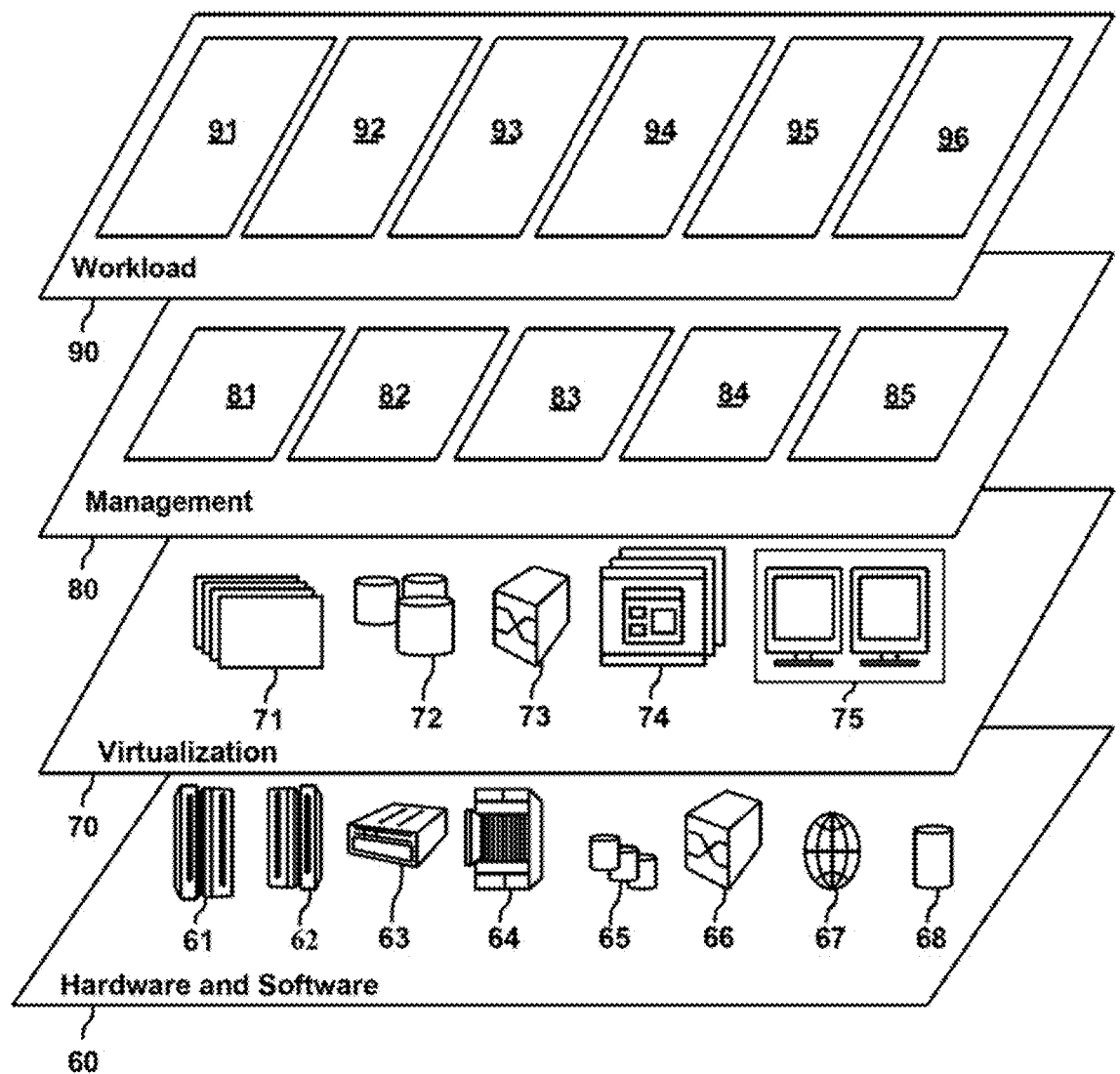
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and code deployment 96.

Existing practices for deploying the code associated with machine learning technologies require the code to be deployed as a whole. Such deployment in the context of multiple computing environments, such as the edge computing environment and the multi-cloud computing environment, can be a challenge for resource provision as well as for code refreshing or updating.

For example, it is often expected to deploy the code into the computing environment having data to be processed by the code. However, the deployment of the code is constrained by the system boundary. For instance, an edge server may have a tremendous amount of data, such as 6 TB, and each individual data file is also very large, such as 5 GB in size. The code for analyzing the data is often deployed in a hybrid cloud. In this case, the data in the edge server need to be transferred to the hybrid cloud. However, a typical containerized hybrid-cloud cannot even load such large amount of data to start analyzing.

An improved solution for code deployment is provided in this disclosure. According to embodiments of the present disclosure, a deployment strategy for deploying code into a plurality of computing environments can be obtained. In addition, respective amounts of resources provided by the plurality of computing environments can also be obtained. In this case, at least one code segment of the code to be deployed in a corresponding computing environment comprised in the plurality of computing environments can be determined based on the deployment strategy and the respective amounts of resources. An amount of resources provided by the corresponding computing environment is sufficient to run the at least one code segment. Thereby, the at least one code segment can be deployed into the corresponding computing environment.

In accordance with the code deployment mechanism as proposed herein, the code segments can be deployed into the corresponding computing environment based on the deployment strategy and the amount of resources provided by that computing environment. As a result, the deployment of the code segments can both conform to the deploy strategy and match the capability of the computing environment, thereby improving the performance and user experience.

Figure 4:
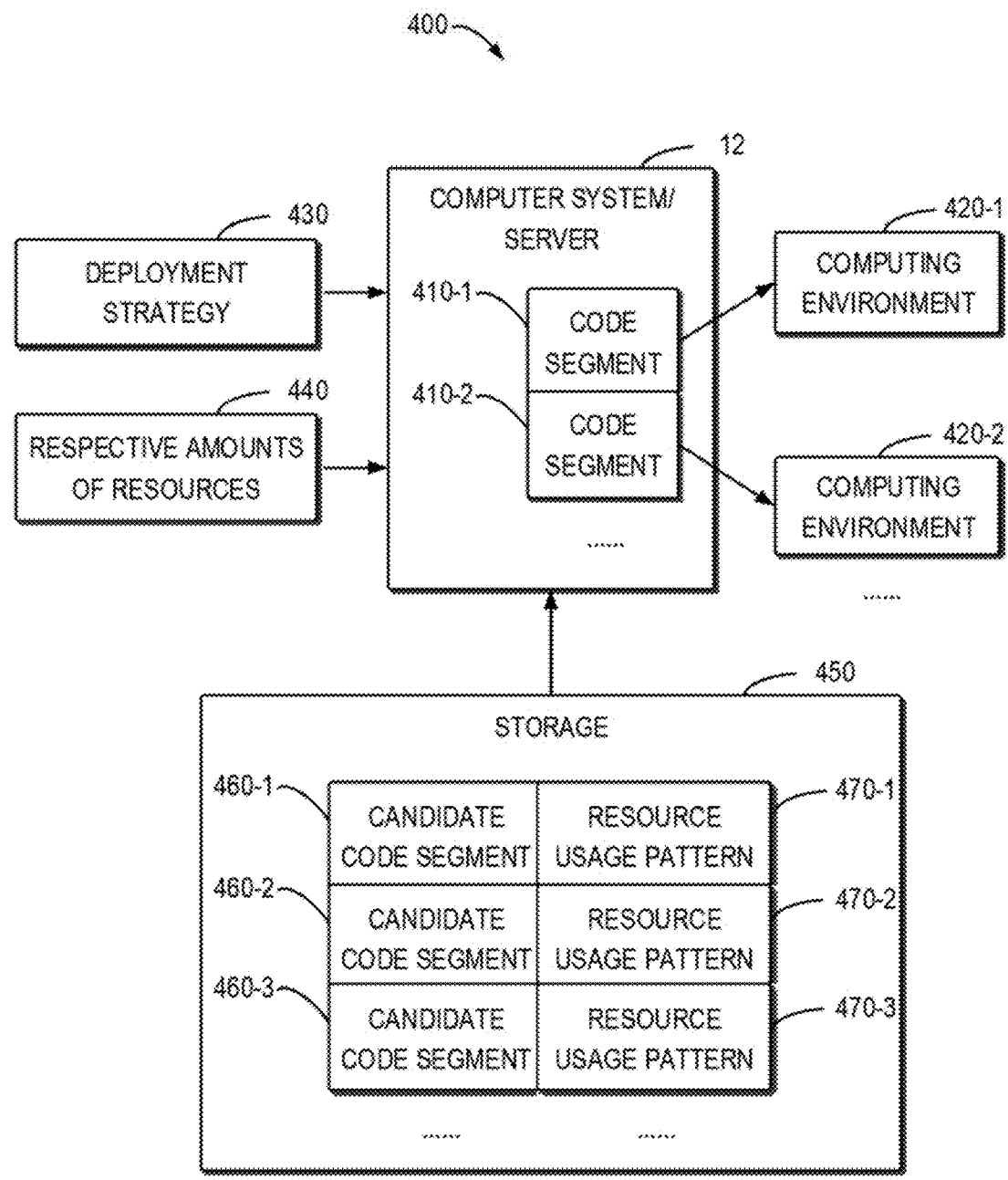
FIG. 4 depicts a schematic diagram of an example of a code deployment environment in which an embodiment of the present disclosure can be implemented.

FIG. 4 depicts a schematic diagram of an example of a code deployment environment 400 in which an embodiment of the present disclosure can be implemented.

The code deployment environment 400 may include the computer system/server 12 and a plurality of computing environments, such as computing environments 420-1 and 420-2 (collectively referred to as "computing environments 420" or individually referred to as "computing environment 420"). For example, the computing environment 420-1 can be the edge computing environment, such as edge servers and edge devices, and the computing environment 420-2 can be the multi-cloud computing environment, such as one or more private/public/hybrid clouds. It is understood that the computing environments 420 can be any appropriate computing environments, and the number and type of the computing environments 420 are intended to be illustrative only and embodiments of the disclosure are not limited thereto.

The computer system/server 12 can deploy the code into the computing environments 420. Specifically, the computer system/server 12 may obtain a deployment strategy 430 for deploying code into the computing environments 420 and respective amounts of resources 440 provided by the computing environments 420. The deployment strategy 430 may indicate how the code is deployed into the computing environments 420.

The computer system/server 12 may further determine, based on the deployment strategy 430 and the respective amounts of resources 440, code segments of the code, such as code segments 410-1 and 410-2 (collectively referred to as "code segments 410" or individually referred to as "code segment 410"), to be deployed in corresponding computing environments 420. It is understood that the number of the code segments 410 is intended to be illustrative only and embodiments of the disclosure are not limited thereto. The deployment of the code segments 410 should conform to the deployment strategy 430, such as the deployment of the code segments should minimize the data transferred between the computing environment 420-1 and the computing environment 420-2. In addition, the amount of resources provided by the corresponding computing environment 420 should be sufficient to run the code segments 410 deployed therein. In this case, the code can be deployed in a desirable way, and resource balance can be improved.

In some embodiments, the code segments 410 may be obtained from a storage 450 storing a plurality of candidate code segments, such as candidate code segments 460-1 to 460-3 (collectively referred to as "candidate code segments 460" or individually referred to as "candidate code segment 460"). It is understood that the number of the candidate code segments 460 is intended to be illustrative only and embodiments of the disclosure are not limited thereto. These candidate code segments 460 are previously derived from the code by analyzing and decomposing the code based on data operations to be performed by the candidate code segments 460. In this case, each candidate code segment 460 may be associated with a certain type of data operations, such as sampling, merging, sorting or the like. As such, the code can be decomposed in an appropriate granularity.

In addition to the candidate code segments 460, respective resource usage patterns of the candidate code segments 460, such as resource usage patterns 470-1 to 470-3 (collectively referred to as "resource usage patterns 470" or individually referred to as "resource usage pattern 470"), can also be obtained from the storage 450. Then, an overall resource usage pattern derived from the resource usage patterns 470 of the candidate code segments 460 to be deployed in the corresponding computing environment 420 can be determined. In this case, by comparing overall amounts of resources required by the overall resource usage patterns and the amounts of resources 440 provided by the corresponding computing environment 420, whether the amount of resources 440 is sufficient to run the code segments 410 can be conveniently determined.

Thereby, the computer system/server 12 can deploy the code segments 410 into their corresponding computing environments 420. For example, the code segment 410-1 may be deployed into the computing environment 420-1, and the code segment 410-2 may be deployed into the computing environment 420-2. It is understood that the deployment of the code segments 410 is intended to be illustrative only and embodiments of the disclosure are not limited thereto. More or less code segments 410 can be deployed into any of the computing environments 420.

In this way, by decomposing the code into the code segments based on the type of data operations, and obtaining the resource usage patterns of the code segments, the code segments can be deployed in a desirable way as indicated by the deployment strategy, such as minimizing the data transferred, while taking into account of capabilities of the deploying computing environments. As such, performance and resource balance can both be improved.

The code deployment performed by the computer system/server 12 is described in more detail with reference to FIGS. 5-10, in which the code analysis phase is first described with reference to FIGS. 5-8, and the code deployment phase is then described with reference to FIGS. 9-10.

Figure 5:
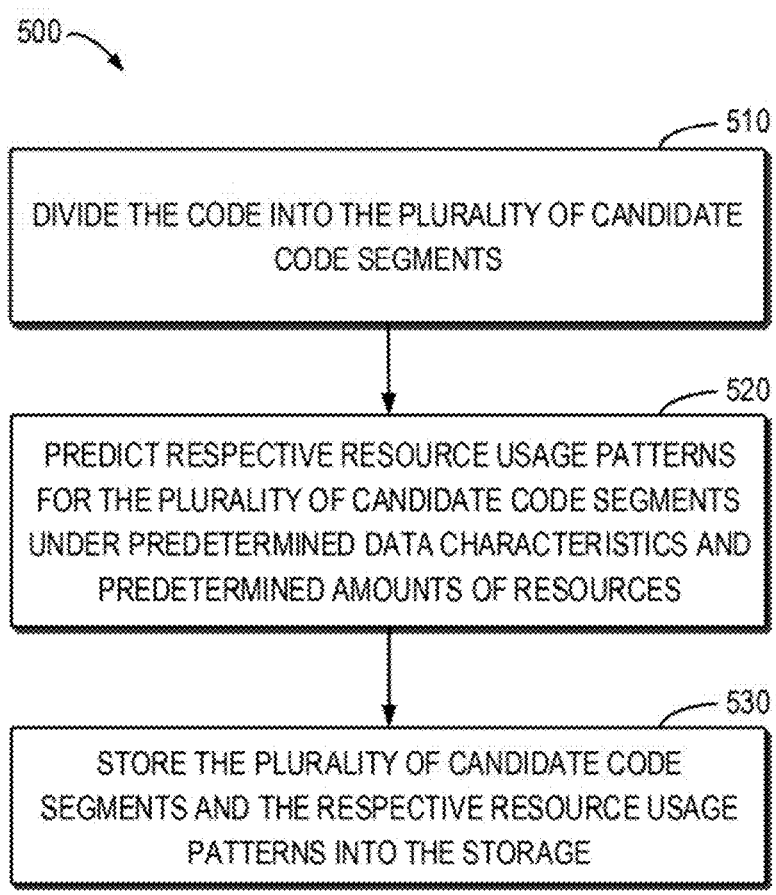
FIG. 5 depicts a flowchart of an example of a method for code analysis according to an embodiment of the present disclosure.

FIG. 5 depicts a flowchart of an example of a method 500 for code analysis according to an embodiment of the present disclosure. At 510, the computer system/server 12 may decompose or divide the code into a plurality of candidate code segments 460. In a further embodiment, the decomposing or dividing action is performed after receiving an analyzing request for analyzing the code or after the code being created. In some embodiments, when the code is created or the user initiates an analyzing request, the computer system/server 12 may receive the analyzing request. The computer system/server 12 may obtain the code based on the analyzing request. For example, the code may be included in the analyzing request, or the analyzing request may indicate an address for obtaining the code.

The candidate code segments 460 may be identified based on data operations to be performed by them. In this case, each of the candidate code segments 460 may be associated with a certain type of data operations. The type of data operations may include a first type without data transformation, such as sampling, sorting, or merging; a second type with data transformation, such as matrix transformation; and a third type of data operations utilizing a machine learning model. It is to be understood that, in addition to identifying the candidate code segments 460 based on these types of the data operations, other candidate code segments performing other operations, such as common operations, can also be identified. Thereby, the entire code can be decomposed into a plurality of candidate code segments. It is understood that the decomposing of the code based on the types of the data operations is only illustrative, and other appropriate approaches can be applied in the decomposing. For example, the code can be decomposed based on function modules.

FIG. 6 depicts a schematic diagram 600 of an example of candidate code segments according to an embodiment of the present disclosure. In FIG. 6, the code at least includes the candidate code segments 610 to 630. The candidate code segment 610 is associated with the sampling operation, the candidate code segment 620 is associated with the matrix transformation operation, and the candidate code segment 630 is associated with the data operation utilizing a machine learning model.

FIG. 5, at 520, the computer system/server 12 may predict respective resource usage patterns 470 for the plurality of candidate code segments 460 under predetermined data characteristics and predetermined amounts of resources. The data characteristics indicate various features of the data, such as size, distribution and missing data ratio. Each of the resource usage patterns 470 indicates the utilization of resources of a corresponding candidate code segment 460. For ease of understanding, FIG. 7 depicts a schematic diagram 700 of an example of the resource usage patterns 470 according to an embodiment of the present disclosure.

Figure 7:
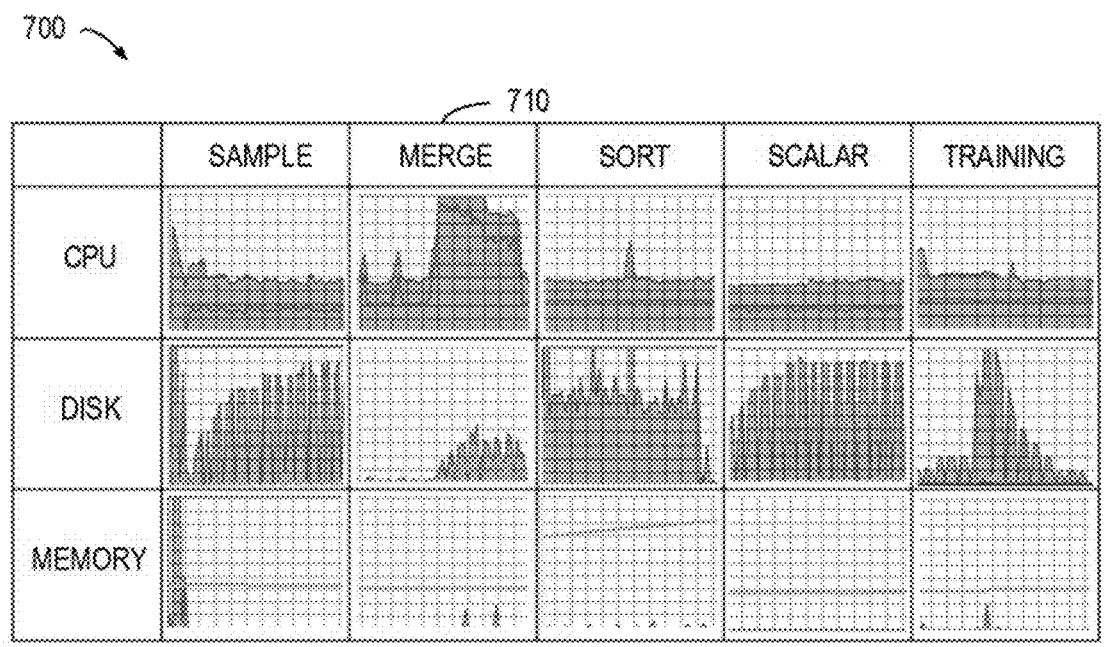
FIG. 7 depicts a schematic diagram of an example of resource usage patterns according to an embodiment of the present disclosure.

Specifically, FIG. 7 shows the usage patterns of CPU (Central Processing Unit), disk and memory of the candidate code segments 460 associated with a variety of data operations (that is, sampling, merging, sorting, scalar function, and training) under respective data characteristics and respective amounts of resources. Take the merge operation 710 as an example, at the initial stage, the candidate code segment 460 associated with the merge operation under a certain data characteristics and a certain amount of resources consumes a moderate amount of CPU resources, a minor amount of disk resources, and very few memory resources. At the later stage, the candidate code segment 460 associated with the merge operation consumes a large amount of CPU resources, a moderate amount of disk resources, and a few memory resources. Other resource usage patterns 470 shown in FIG. 7 can be interpreted likewise.

In addition to the candidate code segment 460, the resource usage pattern 470 can also be affected by data characteristics of data to be processed by the candidate code segment 460 and the amount of resources provided by the computing environment 420 into which the candidate code segment 460 is to be deployed. That is to say, the resource usage pattern 470 can be collectively determined based on the candidate code segment 460, the data characteristics and the amount of resources. In this case, different resource usage patterns 470 of the candidate code segments 460 under different data characteristics and different amounts of resources need to be determined.

Figure 8:
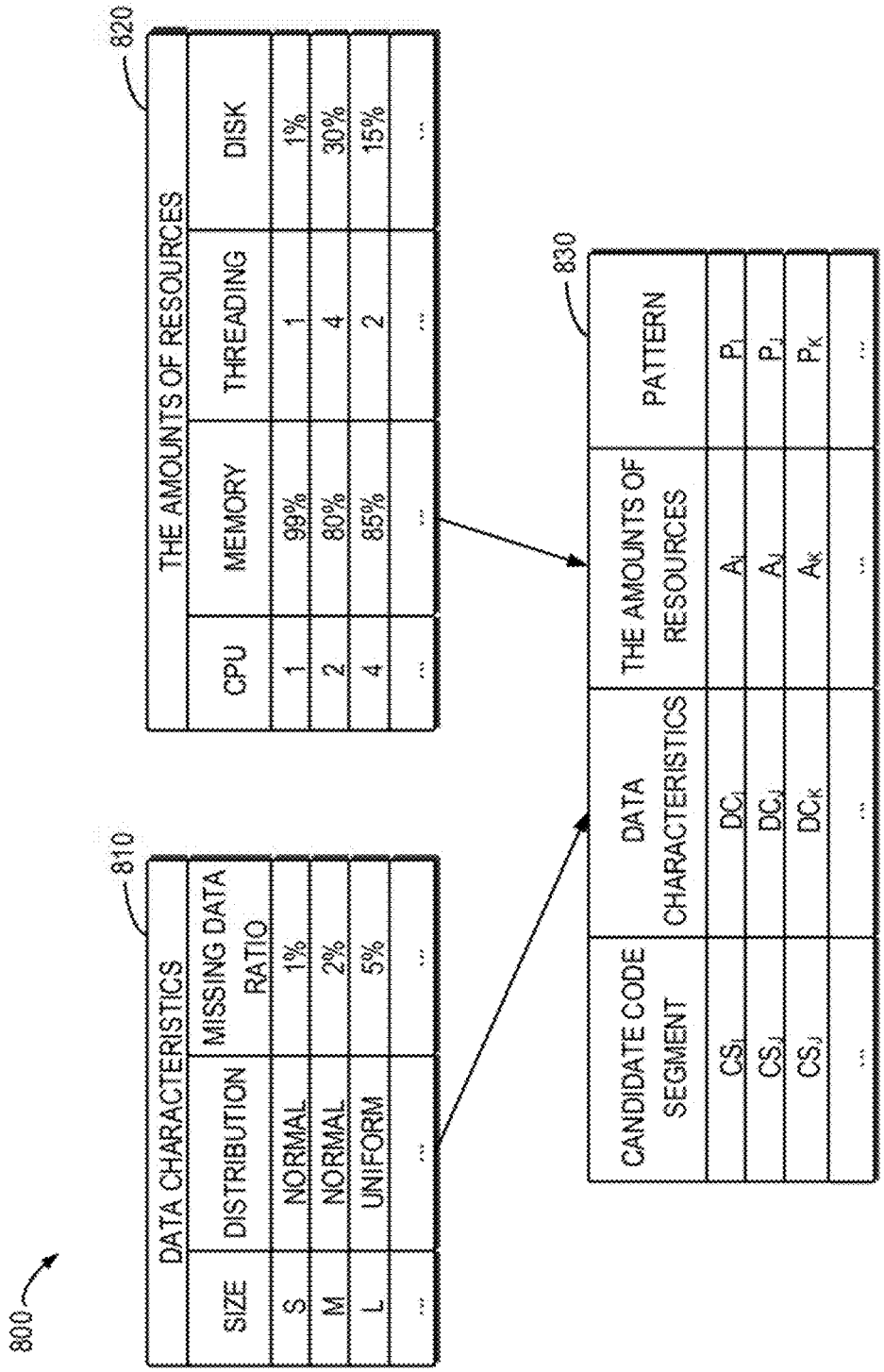
FIG. 8 depicts a schematic diagram of an example of determining resource usage patterns according to an embodiment of the present disclosure.

FIG. 8 depicts a schematic diagram 800 of an example of determining resource usage patterns 470 under various data characteristics 810 and various amounts of resources 820 according to an embodiment of the present disclosure. As shown in FIG. 8, the data characteristics 810 may include the size (such as, small, medium or large), the distribution (such as, the normal distribution or the uniform distribution), and the missing data ratio (such as, 1%, 2% or 5%) of the data to be processed by the candidate code segment 460. The amounts of resources 820 may include the amounts of available CPUs (such as, 1 core, 2 cores or 4 cores), available memory (such as, 99%, 80% or 85%), the amounts of available threads (such as, 1 thread, 2 threads or 4 threads), and available disk space (such as, 1%, 30% or 15%). These different data characteristics 810 and amounts of resources 820 may lead to different resource usage patterns 470 of the candidate code segments 460.

The resource usage patterns 470 can be determined in a variety of ways. In some embodiments, the computer system/server 12 may obtain a trained predicting model, which characterizes associations between the candidate code segments 460, the predetermined data characteristics, the predetermined amounts of resources and the respective predicting resource usage patterns 470. For example, the predicting model may be trained based on historical candidate code segments, historical data characteristics, historical amounts of resources and historical resource usage patterns. The training of the predicting model may be performed by the computer system/server 12 or may be trained by other appropriate computing device. Thereby, the computer system/server 12 may predict the respective resource usage patterns 470 by applying the candidate code segments 460, the predetermined data characteristics and the predetermined amounts of resources into the trained predicting model.

Alternatively, the resource usage patterns 470 can be determined by executing or simulating the execution of the candidate code segments 460 under the various data characteristics 810 and amounts of resources 820.

FIG. 5, at 530, the computer system/server 12 may store the plurality of candidate code segments 460 and the respective resource usage patterns 470 into the storage 450. In addition, the computer system/server 12 may also store the data characteristics 810 and the amounts of resources 820 into the storage 450. For example, the candidate code segments 460, the respective resource usage patterns 470, the data characteristics 810 and the amounts of resources 820 may be stored in association with each other in the storage 450, just like the list 830 shown in FIG. 8.

In this way, the code is appropriately decomposed into the code segments based on the type of data operations, and the respective resource usage patterns of the code segments are determined. As such, this information can be used in the code deployment phase described below.

Figure 9:
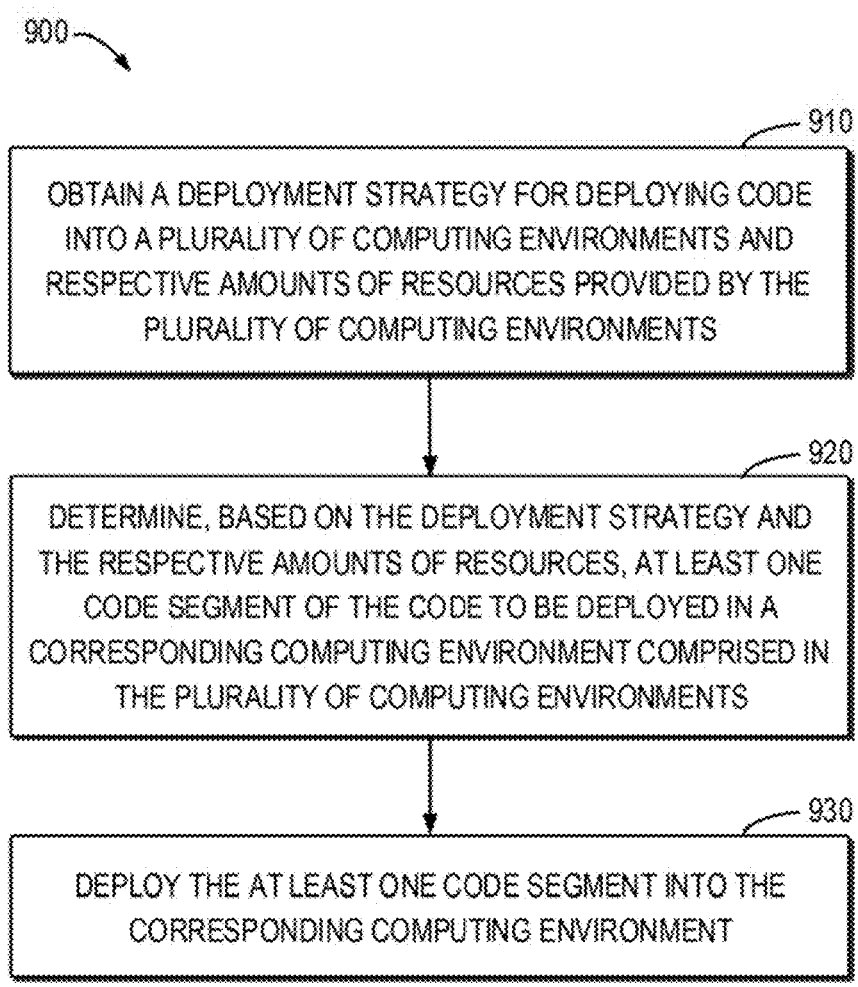
FIG. 9 depicts a flowchart of an example of a method for code deployment according to an embodiment of the present disclosure.

FIG. 9 depicts a flowchart of an example of a method 900 for code deployment according to an embodiment of the present disclosure. At 910, the computer system/server 12 may obtain a deployment strategy 430 for deploying code into a plurality of computing environments 420. In addition, the computer system/server 12 may also obtain respective amounts of resources 440 provided by the plurality of computing environments 420. For example, the deployment strategy 430 may indicate that the code segments should be deployed to minimize the data transferred between the computing environments 420, or the code segments should be deployed to maximize the utilization of a certain computing environment 420, such as to maximize the utilization of the computing capability of the multi-could computing environment.

In some embodiments, the computer system/server 12 may receive a deployment request for deploying the code into the plurality of computing environments 420. The deployment request may indicate the deployment strategy 430 and the respective amounts of resources 440. In this case, the computer system/server 12 may obtain the deployment strategy 430 and the respective amounts of resources 440 from the deployment request. Alternatively, the deployment strategy 430 and the respective amounts of resources 440 may not be included in the deployment request. In this case, when the computer system/server 12 receives the deployment request, it can obtain the predetermined default deployment strategy or ask the user to set the deployment strategy and can inquire the computing environments 420 for the respective amounts of resources.

At 920, the computer system/server 12 may determine, based on the deployment strategy 430 and the respective amounts of resources 440, at least one code segment 410 of the code to be deployed in a corresponding computing environment 420 comprised in the plurality of computing environments 420. The deployment of these code segments 410 conform to the deployment strategy 430, and the amount of resources 440 provided by the corresponding computing environment 420 is sufficient to run these code segments 410.

In some embodiments, as discussed in the code analysis phase, a plurality of candidate code segments 460 derived from the code and respective resource usage patterns 470 predicted for the plurality of candidate code segments 460 may be stored in the storage 450. In this case, the computer system/server 12 may obtain, from the storage 450, at least one candidate code segment 460 and at least one resource usage pattern 470 predicted for the at least one candidate code segment 460.

Moreover, since the resource usage pattern 470 can be affected by the data characteristics 810 and the amount of resources 820, the obtaining of the resource usage pattern 470 for a candidate code segment 460 can be based on the data characteristics 810 and the amount of resources 820. In this case, the computer system/server 12 may determine respective data characteristics for data to be processed by the at least one candidate code segment 460 and the amount of resources provided by the corresponding computing environment 420, and obtain, from the storage 450, the resource usage pattern 470 corresponding to the respective data characteristics and the amount of resources. For example, as shown in the list 830 of FIG. 8, it is assumed that the resource usage pattern 470 for the candidate code segment CSJ is to be obtained. If the determined data characteristics and amount of resources are DCJ and AJ, respectively, then the corresponding pattern PJ is obtained.

In some embodiments, the respective data characteristics for data to be processed by the at least one candidate code segment 460 and the data characteristics previously stored in the list 830 may not be exactly the same, or the amount of resources provided by the corresponding computing environment 420 and the amount of resources previously stored in the list 830 may also not be the same. In this case, the computer system/server 12 may determine a difference between the respective data characteristics for data to be processed by the at least one candidate code segment 460 and the data characteristics previously stored in the list 830, and a difference between the amount of resources provided by the corresponding computing environment 420 and the amount of resources previously stored in the list 830 is also determined. Thereby, the resource usage pattern 470 may be selected based on the differences. For example, the differences may be summed up, and the resource usage pattern 470 with the smallest sum may be selected.

Alternatively, the at least one candidate code segment 460, the respective data characteristics for data to be processed by the at least one candidate code segment 460 and the amount of resources provided by the corresponding computing environment 420 can be applied into the above discussed predicting model. As such, the resource usage patterns 470 can be automatically determined by the predicting model.

The computer system/server 12 may determine an overall resource usage pattern based on the at least one resource usage pattern 470. If the amount of resources 440 provided by the corresponding computing environment 420 fails to satisfy the overall resource usage pattern, the computer system/server 12 may determine whether another computing environment can satisfy the overall resource usage pattern. For example, if the computing environment 420-1 fails to satisfy the overall resource usage pattern, the computer system/server 12 may continue to determine whether the computing environment 420-2 can satisfy the overall resource usage pattern.

In addition, if the amount of resources 440 provided by the corresponding computing environment 420 satisfies the overall resource usage pattern, and the at least one candidate code segment 460 is able to be deployed based on the deployment strategy 430, such as the deployment of the at least one candidate code segment 460 can minimize the data transferred, the computer system/server 12 may determine the at least one candidate code segment 460 as the at least one code segment 410. It is to be understood that the amount of resources 440 provided by the corresponding computing environment 420 satisfying the overall resource usage pattern meanings that the amount of resources 440 provided by the corresponding computing environment 420 exceeds the overall amounts of resources required by the overall resource usage pattern.

Otherwise, if the amount of resources 440 provided by the corresponding computing environment 420 satisfies the overall resource usage pattern, but the deployment of the at least one candidate code segment 460 does not comply with the deployment strategy 430, the computer system/server 12 may iteratively obtain one or more additional candidate code segment(s) 460 and corresponding resource usage pattern(s) 470 from the storage 450, until the deployment strategy 430 and the resource constraint of the corresponding computing environment 420 are both satisfied. Specifically, the newly obtained additional candidate code segment(s) 460 and the previous at least one candidate code segment 460 can be collectively treated as the at least one candidate code segment 460. That is to say, the at least one candidate code segment 460 can be updated by incorporating the newly obtained additional candidate code segment(s) 460.

Then, the overall resource usage pattern of the updated at least one candidate code segment 460 can be determined based on their respective resource usage pattern 470. If the amount of resources 440 provided by the corresponding computing environment 420 satisfies the overall resource usage pattern, and the updated at least one candidate code segment 460 is able to be deployed based on the deployment strategy 430, the computer system/server 12 may determine the updated at least one candidate code segment 460 as the at least one code segment 410.

In some embodiments, in order to determine the overall resource usage pattern, for the candidate code segments 460 to be deployed in the corresponding computing environment 420, the computer system/server 12 may determine the execution sequence of these candidate code segments 460, and the overall resource usage pattern may be determined based on the execution sequence.

For example, for sequential candidate code segments 460, the overall resource usage pattern may be determined based on the maximum resource usage indicated in the resource usage patterns 470. For parallel candidate code segments 460, the resource usage indicated in the resource usage patterns 470 may be summed up, and the overall resource usage pattern may be determined based on the sum. For nested candidate code segments 460, that is, the sequential candidate code segments nested with the parallel candidate code segments, the sequential candidate code segments and parallel candidate code segments in the nested candidate code segments may be separately determined and integrated to determine the overall resource usage pattern.

An example of the determination of the at least one code segment is described with reference to FIG. 10, which depicts a schematic diagram 1000 of an example of code segments according to an embodiment of the present disclosure. It is assumed that the deployment strategy 430 indicates that the code segments should be deployed to minimize the data transferred between the computing environment 420-1 and the computing environment 420-2. It is also assumed that the data volume output by the candidate code segment 1010 includes 178 rows and 14 columns, the data volume output by the candidate code segment 1020 includes 178 rows and 2 columns, and the data volume output by the candidate code segment 1030 includes 178 rows and 1 column. It can be seen that, the data volume output by the candidate code segment 1030 is minimized. In this case, the candidate code segments 1040 located above the candidate code segment 1030 can cause the minimized data transferring.

In addition, it is also assumed that the amount of resources provided by the computing environment 420-1 satisfies the overall resource usage pattern of candidate code segments 1040, and thus can support the execution of the candidate code segments 1040. Since the candidate code segments 1040 conform to the deployment strategy of minimizing the data transferring and can be supported by the computing environment 420-1, the candidate code segments 1040 can be determined as the code segments to be deployed in the computing environment 420-1. Then, the remaining portion 1050 of the code may be determined to be deployed into the computing environment 420-2. In this case, as shown in the example of FIG. 10, the code segments regarding the data preparation and transformation are to be deployed in the computing environment 420-1, while the code segments regarding the model training and making prediction are to be deployed in the computing environment 420-2. Alternatively, the code segments 410 to be deployed into the computing environment 420-2 can further be determined in a similar manner as the computing environment 420-1.

In addition, in some embodiments, the storage 450 may also store dependency information of the candidate code segment 460. For example, the dependency information may indicate a tool or runtime file, such as a third-party library, on which the candidate code segment 460 depends. In this case, the computer system/server 12 may obtain the dependency information from the storage 450, and further determine whether the computing environments 420 have related tools or files required for executing the candidate code segment 460.

Moreover, the computer system/server 12 may also determine a data exchange strategy between the code segments to be deployed in one computing environment (such as the computing environment 420-1) and the code segments to be deployed in another computing environment (such as the computing environment 420-2). For example, the data exchange strategy may indicate a data structure which will be output from the code segments to be deployed in computing environment 420-1 and then input to the code segments to be deployed in computing environment 420-2. For instance, the data exchange strategy may indicate that a first field of the data structure is a name of a parameter and a second field of the data structure is a value of the parameter. Thereby, the computing environment 420-2 can easily and conveniently parse the data received from the computing environment 420-1.

At 930, the computer system/server 12 may deploy the at least one code segment 410 into the corresponding computing environment 420. In some embodiments, the computer system/server 12 may generate a deployment plan. The deployment plan may indicate which of the code segments 410 is to be deployed into which of the computing environments 420. The computer system/server 12 may deploy the code segments 410 into the computing environments 420 as indicated by the deployment plan.

In this way, by decomposing the code into the code segments based on the type of data operations, and predicting the resource usage patterns of the code segments, the code segments can be deployed in a desirable way, such as minimizing the data transferred, while taking into account of the capability of the deploying computing environments. As such, performance and resource balance can both be improved.

In addition, when the at least one code segment is deployed in the corresponding computing environment, the computer system/server 12 may further monitor or determine an actual resource usage pattern of the at least one code segment, and update the deployment of the at least one code segment or the entire code based on the monitoring result. For example, the actual overall resource usage pattern may fail to match the predicted overall resource usage pattern, or the at least one actual resource usage pattern of the at least one code segment may fail to match its predicted resource usage pattern. Such mismatch may indicate that the predicted resource usage pattern is inaccurate or incorrect. In this case, the computer system/server 12 may update the deployment of the at least one code segment or the entire code.

Additionally, the computer system/server 12 may also monitor whether the code is updated. If the code is updated, the computer system/server 12 may update the deployment of the updated code. In some embodiments, the computer system/server 12 may update the deployment of the entire code. Alternatively, the computer system/server 12 may only update the deployment of the updated part. For example, if the machine learning model is updated, only the deployment of the machine learning model can be updated, without affecting the deployment of the other code segments. As such, the efficiency and security of the updating can be improved.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A computer-implemented method, comprising:
   obtaining, by one or more processors, a deployment strategy for deploying code into a plurality of computing environments and respective amounts of resources provided by the plurality of computing environments;
   determining, by the one or more processors, based on the deployment strategy and the respective amounts of resources, at least one code segment of the code to be deployed in a corresponding computing environment comprised in the plurality of computing environments, an amount of resources provided by the corresponding computing environment being sufficient to run the at least one code segment; and
   wherein determining the at least one code segment comprises:
   obtaining, by the one or more processors, from a storage storing a plurality of candidate code segments derived from the code and respective resource usage patterns predicted for the plurality of candidate code segments, at least one candidate code segment and respective resource usage pattern predicted for the at least one candidate code segment;
   determining an overall resource usage pattern based on the at least one resource usage pattern; and
   in response to the amount of resources provided by the corresponding computing environment satisfying the overall resource usage pattern, and the at least one candidate code segment being able to be deployed based on the deployment strategy, determining, by the one or more processors, the at least one candidate code segment as the at least one code segment;
   deploying, by the one or more processors, the at least one code segment into the corresponding computing environment.

2. The method of claim 1, wherein obtaining the deployment strategy and the respective amounts of resources comprises:
   receiving, by the one or more processors, a deployment request for deploying the code into the plurality of computing environments, the deployment request indicating the deployment strategy and the respective amounts of resources; and
   obtaining, by the one or more processors, the deployment strategy and the respective amounts of resources from the deployment request.

3. The method of claim 1, wherein obtaining the respective resource usage pattern comprises:
   determining, by the one or more processors, respective data characteristics for data to be processed by the at least one candidate code segment and the amount of resources provided by the corresponding computing environment; and
   obtaining, by the one or more processors, from the storage, the resource usage pattern corresponding to the respective data characteristics and the amount of resources.

4. The method of claim 1, further comprising:
   in response to the at least one code segment being deployed in the corresponding computing environment, determining, by the one or more processors, an actual resource usage pattern of the at least one code segment; and
   in response to the actual resource usage pattern failing to match the overall resource usage pattern, updating, by the one or more processors, the deployment of the at least one code segment.

5. The method of claim 1, wherein the candidate code segments are derived from the code by:
   dividing, by the one or more processors, the code into the plurality of candidate code segments, each of the candidate code segments being associated with a type of data operations;
   predicting, by the one or more processors, respective resource usage patterns for the plurality of candidate code segments under predetermined data characteristics and predetermined amounts of resources; and
   storing, by the one or more processors, the plurality of candidate code segments and the respective resource usage patterns into the storage.

6. The method of claim 5, wherein the type of data operations includes any of the following:
   a first type without data transformation;

a second type with data transformation; and
a third type utilizing a machine learning model.

7. The method of claim 5, wherein predicting the respective resource usage patterns comprises:
obtaining, by the one or more processors, a trained predicting model, the predicting model characterizing associations between the candidate code segments, the predetermined data characteristics, the predetermined amounts of resources and the respective predicting resource usage patterns; and
predicting, by the one or more processors, the respective resource usage patterns by applying the candidate code segments, the predetermined data characteristics and the predetermined amounts of resources into the trained predicting model.

8. The method of claim 1, further comprising:
determining, by one or more processors, that the code is being updated, updating, by the one or more processors, the deployment of the updated code.

9. A system, comprising:
a processing unit; and
a memory coupled to the processing unit and storing instructions thereon, the instructions, when executed by the processing unit, performing acts including:
obtaining a deployment strategy for deploying code into a plurality of computing environments and respective amounts of resources provided by the plurality of computing environments;
determining, based on the deployment strategy and the respective amounts of resources, at least one code segment of the code to be deployed in a corresponding computing environment comprised in the plurality of computing environments, an amount of resources provided by the corresponding computing environment being sufficient to run the at least one code segment; and
wherein determining the at least one code segment comprises:
obtaining from a storage storing a plurality of candidate code segments derived from the code and respective resource usage patterns predicted for the plurality of candidate code segments, at least one candidate code segment and respective resource usage pattern predicted for the at least one candidate code segment;
determining an overall resource usage pattern based on the at least one resource usage pattern; and
in response to the amount of resources provided by the corresponding computing environment satisfying the overall resource usage pattern, and the at least one candidate code segment being able to be deployed based on the deployment strategy, determining the at least one candidate code segment as the at least one code segment;
deploying the at least one code segment into the corresponding computing environment.

10. The system of claim 9, wherein obtaining the deployment strategy and the respective amounts of resources comprises:
receiving a deployment request for deploying the code into the plurality of computing environments, the deployment request indicating the deployment strategy and the respective amounts of resources; and
obtaining the deployment strategy and the respective amounts of resources from the deployment request.

11. The system of claim 9, wherein obtaining the respective resource usage pattern comprises:

determining respective data characteristics for data to be processed by the at least one candidate code segment and the amount of resources provided by the corresponding computing environment; and
obtaining, from the storage, the resource usage pattern corresponding to the respective data characteristics and the amount of resources.

12. The system of claim 9, wherein the acts further comprise:
in response to the at least one code segment being deployed in the corresponding computing environment, determining an actual resource usage pattern of the at least one code segment; and
in response to the actual resource usage pattern failing to match the overall resource usage pattern, updating the deployment of the at least one code segment.

13. The system of claim 9, wherein the candidate code segments are derived from the code by:
dividing the code into the plurality of candidate code segments, each of the candidate code segments being associated with a type of data operations;
predicting respective resource usage patterns for the plurality of candidate code segments under predetermined data characteristics and predetermined amounts of resources; and
storing the plurality of candidate code segments and the respective resource usage patterns into the storage.

14. The system of claim 13, wherein the type of data operations includes any of the following:
a first type without data transformation;
a second type with data transformation; and
a third type utilizing a machine learning model.

15. The system of claim 13, wherein predicting the respective resource usage patterns comprises:
obtaining a trained predicting model, the predicting model characterizing associations between the candidate code segments, the predetermined data characteristics, the predetermined amounts of resources and the respective predicting resource usage patterns; and
predicting the respective resource usage patterns by applying the candidate code segments, the predetermined data characteristics and the predetermined amounts of resources into the trained predicting model.

16. The system of claim 9, wherein the acts further comprise:
determining that the code is being updated, updating the deployment of the updated code.

17. A computer program product, comprising a computer-readable storage medium having program instructions embodied therewith, the program instructions executable by a processor to cause the processor to perform acts including:
obtaining a deployment strategy for deploying code into a plurality of computing environments and respective amounts of resources provided by the plurality of computing environments;
determining, based on the deployment strategy and the respective amounts of resources, at least one code segment of the code to be deployed in a corresponding computing environment comprised in the plurality of computing environments, an amount of resources provided by the corresponding computing environment being sufficient to run the at least one code segment; and
wherein determining the at least one code segment comprises:
obtaining, from a storage storing a plurality of candidate code segments derived from the code and respective resource usage patterns predicted for the plurality of candidate code segments, at least one candidate code segment and respective resource usage pattern predicted for the at least one candidate code segment;

determining an overall resource usage pattern based on the at least one resource usage pattern; and in response to the amount of resources provided by the corresponding computing environment satisfying the overall resource usage pattern, and the at least one candidate code segment being able to be deployed based on the deployment strategy, determining the at least one candidate code segment as the at least one code segment;

deploying the at least one code segment into the corresponding computing environment.

* * * * *